United States Patent
Garg et al.

(10) Patent No.: US 9,307,204 B1
(45) Date of Patent: Apr. 5, 2016

(54) ENHANCEMENT OF MEDIA SINK COMPATIBILITY

(71) Applicant: Amazon Technologies, Inc., Reno, NV (US)

(72) Inventors: Parag K. Garg, Woodinville, WA (US); Quais Taraki, Bellevue, WA (US); Kevin T. Weston, Jr., Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 357 days.

(21) Appl. No.: 13/675,392

(22) Filed: Nov. 13, 2012

(51) Int. Cl.
G06F 11/00 (2006.01)
H04N 7/173 (2011.01)

(52) U.S. Cl.
CPC ........... *H04N 7/173* (2013.01)

(58) Field of Classification Search
CPC . H04N 7/173; H04N 7/183; H04N 21/43635; H04B 10/12
USPC .......................................................... 714/3
See application file for complete search history.

(56) References Cited

U.S. PATENT DOCUMENTS

| | | | | |
|---|---|---|---|---|
| 5,988,078 A * | 11/1999 | Levine | 715/721 |
| 7,162,733 B2 * | 1/2007 | Kamieniecki | 725/133 |
| 7,565,530 B2 * | 7/2009 | Kwak et al. | 713/156 |
| 7,729,618 B2 * | 6/2010 | Tatum et al. | 398/139 |
| 7,729,718 B2 * | 6/2010 | Kazmi et al. | 455/522 |
| 7,755,653 B2 * | 7/2010 | Takamori | 345/699 |
| 8,068,183 B2 * | 11/2011 | Stecyk | 348/734 |
| 8,392,958 B2 * | 3/2013 | Hayashi et al. | 725/133 |
| 8,767,006 B2 * | 7/2014 | Sullivan et al. | 345/601 |
| 8,935,740 B2 * | 1/2015 | Suzuki et al. | 725/149 |
| 8,966,566 B2 * | 2/2015 | Toba | 725/118 |
| 2003/0206563 A1 * | 11/2003 | Lazarus et al. | 370/526 |
| 2007/0186015 A1 * | 8/2007 | Taft et al. | 710/16 |
| 2007/0222779 A1 * | 9/2007 | Fastert et al. | 345/418 |
| 2007/0274689 A1 * | 11/2007 | Stone | 386/123 |
| 2009/0027405 A1 * | 1/2009 | Kaga | 345/520 |
| 2009/0193490 A1 * | 7/2009 | Stone et al. | 725/151 |
| 2010/0033627 A1 * | 2/2010 | Hayashi et al. | 348/500 |
| 2010/0033668 A1 * | 2/2010 | Koito et al. | 349/155 |
| 2011/0060936 A1 * | 3/2011 | Schuette | 714/1 |
| 2011/0069647 A1 * | 3/2011 | Shao et al. | 370/310 |
| 2011/0173485 A1 * | 7/2011 | Hassan et al. | 714/2 |
| 2011/0283129 A1 * | 11/2011 | Guillerm | 713/324 |
| 2013/0057774 A1 * | 3/2013 | Yoshida et al. | 348/725 |
| 2013/0191563 A1 * | 7/2013 | Toba et al. | 710/62 |

* cited by examiner

*Primary Examiner* — Amine Riad
(74) *Attorney, Agent, or Firm* — Sutherland Asbill & Brennan LLP

(57) ABSTRACT

Described herein are systems and methods to facilitate and enhance compatibility between a source device, such as a set-top box, and a sink device, such as a television or audio system. The source device is configured to recognize extended display identification data ("EDID") associated with sink devices which have been determined to provide incorrect EDID data. A replacement EDID is used by the source to provide operability. Likewise, commands from the source which are incompatible with, or produce undesired results in the sink may be removed or replaced with replacement commands.

16 Claims, 9 Drawing Sheets

Device Blacklist 120

| Device Identifier 602 | Actual Operational Characteristics 604 | | | | | Replacement EDID 130 | Command 302 | Replacement Command 304 |
|---|---|---|---|---|---|---|---|---|
| | 480P 604(1) | 1080P 604(2) | 720P 604(3) | 5.1 Audio 604(4) | Other 604(A) | | | |
| GR93 | 1 | 1 | 1 | 1 | 1 | ...111111... | Set_AVMUTE | <null> |
| XY17 | 1 | 0 | 1 | 0 | 0 | ...101000... | UPC_EAN_ISRC_1 | UPC_EAN_ISRC_2 |
| TV12 | 1 | 1 | 0 | 1 | 1 | ...110110... | Default_Phase=0 | Default Phase=3 |
| TV456 | 1 | 1 | 1 | 1 | 1 | ...111110... | CTL0:3=1010 | CTL0:3=1001 |
| TV67 | 1 | 0 | 1 | 0 | 1 | ...101011... | <Give Deck Status> | <null> |

FIG. 6

ENHANCEMENT OF MEDIA SINK COMPATIBILITY

BACKGROUND

A wide variety of content is available to users for access electronically. Access to this content may be provided by media device sources ("sources") which send data representative of the content to media device sinks ("sinks") for presentation. Sources may include set-top boxes, cable television receivers, digital versatile disk ("DVD") players, and so forth. Sinks may include televisions, projection displays, audio systems, haptic output devices, recording or storage devices, and so forth.

Over time, users may change the sources and sinks which they use. Set-top boxes may be replaced, new televisions purchased, and so forth. Users have the expectation that when they connect the sources and the sinks, the devices will function properly. Occasionally connection of a source and a sink results in an adverse user experience, such as a black screen being presented on the television, audio pops and noise from an audio system, and so forth. These adverse user experiences are frustrating for users, and may result in costly consequences such as return of purchased devices, providing technical support to the user to remedy the situation, and so forth.

BRIEF DESCRIPTION OF THE DRAWINGS

FIG. 6 illustrates a block diagram of the device blacklist data.

Figure 1:
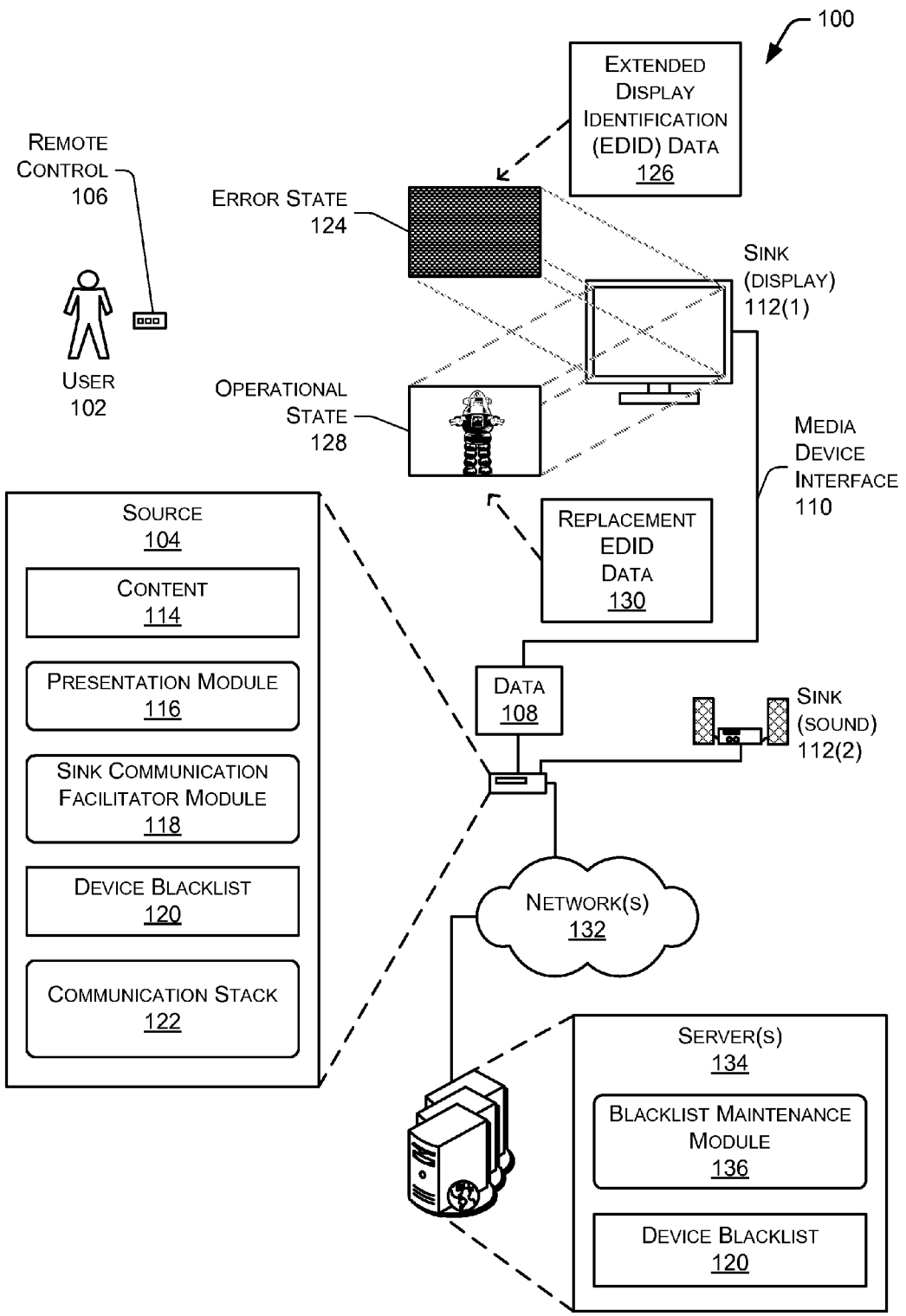
FIG. 1 illustrates a system for enhancing compatibility between a media source and a sink.

Certain implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

A growing collection of content is available for users to access. This content may include television programming, electronic books ("eBooks"), audiobooks, music, movies, games, and so forth. The collection of media devices used to access this content grows as well. These media devices may be broadly grouped into "sources" which provide data for presentation, and "sinks" which receive the data and generate output to the user. Sources may include, but are not limited to set-top boxes, streaming media devices, broadcast satellite receivers, broadcast radio receivers, cable television interfaces, eBook readers, computers, game consoles, and so forth. Sinks may include display devices, audio systems, haptic devices, digital video recorders, and so forth. For example, a sink may be a media presentation device such as a television. In some implementations a device may be both a source and a sink either simultaneously or at different times.

The sources and the sinks may connect to one another using an interface such as a media device interface. One such media device interface is the high-definition multimedia interface ("HDMI"), as promulgated by HDMI Licensing, LLC. Designers and manufacturers of source and sink devices endeavor to provide equipment which will interoperate without difficulty. For example, the source and sink will recognize one another and enable the transfer of data which is properly presented as output. Occasionally interoperability is impaired, resulting in error states during presentation. For example, incorrect information in extended display identifier ("EDID") data provided by a sink to a source may result in a black screen when the sink is a display device. Or a sink may be unable to properly process a particular command from a source, resulting in undesired operation. These error states may result in significant adverse user experiences.

These adverse user experiences may incur costs to distributors, manufacturers, and others in the supply and maintenance chain associated with the devices. For example, error states such as black screens may result in product returns, increased product support costs, lost sales, and so forth.

Described herein are devices and methods for enhancing compatibility between media sources and media sinks by modifying some communications between the source and sink. Error states involving black screens may be associated with a sink incorrectly reporting to a source one or more operational characteristics of the sink. The operational characteristics may include modes supported, color gamut used, audio encoding, and so forth. Where the source and sink are coupled using a media device interface implementing the HDMI standard, the sink provides extended display identification ("EDID") data to the source. A communication stack of the source uses this EDID information to configure the stack such that data may be transferred to the sink and properly presented. For example, the EDID may report that the sink is capable of displaying 1080p images at 60 frames per second (fps). The communication stack, acting on this data, may format the data accordingly.

However, in some situations the EDID information provided by the sink incorrectly reflects the operational characteristics of the sink. Continuing the example, the EDID may incorrectly report the sink is capable of displaying 1080p images at 60 fps, when the sink is actually only capable of supporting 720p images at 30 fps. Using this incorrect information, the source sends data to the sink which is not suitable for proper presentation. As a result, the sink may experience an error state, such as presentation of a black screen or audio pops or hisses.

A device blacklist of devices which have incorrect EDID information may be maintained. The device blacklist may contain, or be associated with a data structure which contains, a replacement EDID which correctly reflects actual operational characteristics of the sink. During operation, EDID data received by the source is checked against this device blacklist. When a match is found, the received EDID data is ignored and the corresponding replacement EDID data is used instead. As a result, the incorrect EDID data is bypassed and correct operation is provided.

In another implementation, the source and the sink may be interoperable and able to present content, but some commands involved in the presentation, presentation setup, and so forth may be incorrectly processed by the sink. For example, some sink devices may incorrectly process the "Set_AVMUTE" command as defined in the HDMI specification. This incorrect processing may manifest as audible noise, visual presentation problems, "freezing" of the sink, and other undesired operation or error states. Commands which are sent by the communication stack may be intercepted and compared against the blacklist or another data structure. Commands which are known to be defective or otherwise produce undesired results with the sink may have a replacement command associated with them. The replacement command may then be used to provide error-free operation. In some instances, the replacement command may be a null or empty command, such as where no operable replacement command is available.

The device blacklist may include a device identifier with an associated replacement EDID, one or more replacement commands, or both for each identified device. A server may be used to maintain the device blacklist. As additional error states are determined, such as through testing or from operation of other source devices with other sinks, information may be provided to the server and the device blacklist may be updated. These updates may then be distributed to the source devices.

Using the blacklist and the replacement EDIDs, replacement commands, or both, the user experience is improved. Users may connect sources and sinks with an even greater assurance that they will interoperate without difficulty. User satisfaction is improved, while associated costs to the distributors, manufacturers, and others are reduced.

Illustrative System

FIG. 1 illustrates a system 100 for enhancing compatibility between media sources and media sinks. A user 102 may use a source device 104 with a remote control 106 to send data 108 along a media device interface 110 to a sink 112. For example, as illustrated, the source 104 may be connected to a first sink 112(1) which is a media presentation device such as a display or television, and a second sink 112(2), such as an audio system.

The media device interface 110 is configured to provide transfer of the data 108 between the source 104 and the sink 112. The media device interface 110 may comprise a high-definition multimedia interface ("HDMI") which may implement a feature set such as the Consumer Electronics Control ("CEC"), local area network ("LAN"), wireless local area network ("WLAN"), personal area network ("PAN") such as Bluetooth™, and so forth.

The source device 104 may be configured to store at least a portion of content 114, such as movies, music, and so forth. A presentation module 116 is configured to access the content 114 and generate the data 108 for presentation. The presentation module 116 may provide services such as decoding, decryption, digital rights management, and so forth.

A sink communication facilitator module 118 is coupled to the presentation module 116 and also accesses a device blacklist 120. The sink communication facilitator module 118, in turn, couples to a communication stack 122. The sink communication facilitator module 118 is configured to modify communications originating from, or destined for, the communication stack 122. The communication stack 122 provides data connectivity functionality between the modules of the source 104 and the sink 112 using the media device interface 110. The communication stack 122 may implement one or more communication protocols.

The sink communication facilitator module 118 may be configured to determine a device identity of the sink 112 coupled to the media device interface 110 of the source 104. Based at least in part on the device identity, the sink communication facilitator module 118 retrieves information from the device blacklist 120. This information is then used to modify the interactions of the communication stack 122. In some implementations the sink communication facilitator module 118 may be conceptualized as a computing shim between the communication stack and other modules. Operation of the sink communication facilitator module 118 is described below in more detail.

As depicted in this illustration, the sink 112(1) may be in an error state 124. The error state 124 may include one or more of a black screen on a display sink 112(1), an incorrect image presentation on the display sink 112(1), incorrect audio presentation by a speaker or other audio sink 112(2), and so forth. This error state 124 may result from extended display identification ("EDID") data 126 which is improper, malformed, or otherwise defective being sent from the sink 112(1) to the source 104 using the media device interface 110. In some implementations other devices may be between the source 104 and the sink 112 on the media device interface 110. For example, the source 104 may connect using the media device interface 110 to an intermediary device which in turn connects using a media device interface 110 to the sink 112. This intermediary device may corrupt or modify the EDID data 126 such that the EDID data ultimately delivered to the source 104 is incorrect, malformed, or otherwise defective.

The EDID data 126, or equivalent information sent along the media device interface 110, provides operational characteristics of the sink 112 to the source 104. The operational characteristics may include display modes supported, color gamut used, audio encoding, support for control data over the media device interface 110, and so forth.

The EDID data 126 described in this disclosure may be compliant with one or more of the EDID or Enhanced EDID standards published by the Video Electronics Standards Association ("VESA"). In other implementations, the systems and methods described in this disclosure may be applied to data which provides similar functionality.

Based on the EDID data 126, the source 104 may select particular formats, data rates, encoding schemes, and so forth to provide the data 108 in a way which is operable with the sink 112 to present the content 114. For example, the EDID data 126 may report that the sink 112(1) is capable of displaying 1080p images at 60 fps. However, in some situations the EDID data 126 provided by the sink 112 incorrectly reflects the operational characteristics of the sink 112. Continuing the example, the EDID data 126 may report the sink 112(1) is capable of display 1080p images at 60 fps when the sink 112(1) is actually only capable of supporting 720p images at 30 fps. Using this incorrect EDID data 126, the source sends data to the sink which is not suitable for proper presentation. As a result, the sink 112(1) may present the error state 124, such as a black screen.

The sink communication facilitator module 118 is configured to intercept the EDID data 126 which is received from the sink 112. The sink communication facilitator module 118 may process the EDID data 126 to determine a device identifier associated with the sink 112. For example, the EDID data 126 may encode a manufacturer identifier, model number, product code, and so forth which is associated with a particular make or model of sink 112. The device identifier may be compared with those previously stored in the device blacklist 120. When the device identifier from the sink 112 matches an entry in the device blacklist 120, the received EDID data 126 is discarded.

In place of the received EDID data 126, the sink communication facilitator module 118 is able to produce an operational state 128 of the sink 112 by providing to the communication stack 122 replacement EDID data 130. This replacement EDID data 130 correctly describes the operational characteristics of the sink 112. In some implementations, the replacement EDID data 130 comprises one or more bits of data differing from the received EDID 126, with the one or more bits of data indicative of actual operational characteristics of the device based at least in part on test data for the particular design of the sink 112.

Continuing the example, the replacement EDID data 130 associated with the sink 112(1) may indicate the sink 112(1) supports 720p images at 30 fps. As a result, the presentation module 116 may deliver data 108 which is operable for presentation on the sink 112. Instead of the error state 124, the user experiences the operational state 128 of content presented properly on the sink 112.

In another implementation, the EDID data 126 itself may be used to retrieve information from the device blacklist 120. For example, rather than identifying the sink 112, the received EDID data 126 or a hash based on the received EDID data 126 may be used to reference a particular replacement EDID data 130.

The sink communication facilitator module 118 may also be configured to modify commands which are sent to the communication stack 122, or by the communication stack 122, for transmission to the sink 112. In some situations, the sink 112 may experience an error state upon receiving particular commands. For example, the sink 112 may be incorrectly configured such that the HDMI command "Set_AVMUTE" may result in undesired behavior by the sink 112 such as a black screen and audio noise. The sink communication facilitator module 118 may be configured to check commands against the device blacklist 120, and generate replacement commands or suppress the command to minimize or eliminate the undesired behavior. Continuing the example, the "Set_AVMUTE" command may be discarded by the sink communication facilitator module 118 and not be passed along to the particular sink 112 which would behave incorrectly.

The source 104 may couple to one or more networks 132. The networks 132 may comprise one or more private networks, public networks such as the Internet, or a combination of both configured to transfer data between two or more devices.

One or more servers 134 may couple to the network 132, and are configured to communicate with the source 104. The server 134 may include a blacklist maintenance module 136 which is configured to maintain the device blacklist 120. The server 134 may generate new entries or update existing entries in the device blacklist 120 based at least in part on user input, manual testing such as provided by a designer of the source 104 or sinks 112, automated generation based on telemetry received from sources 104 experiencing error states 124, and so forth.

Figure 2:
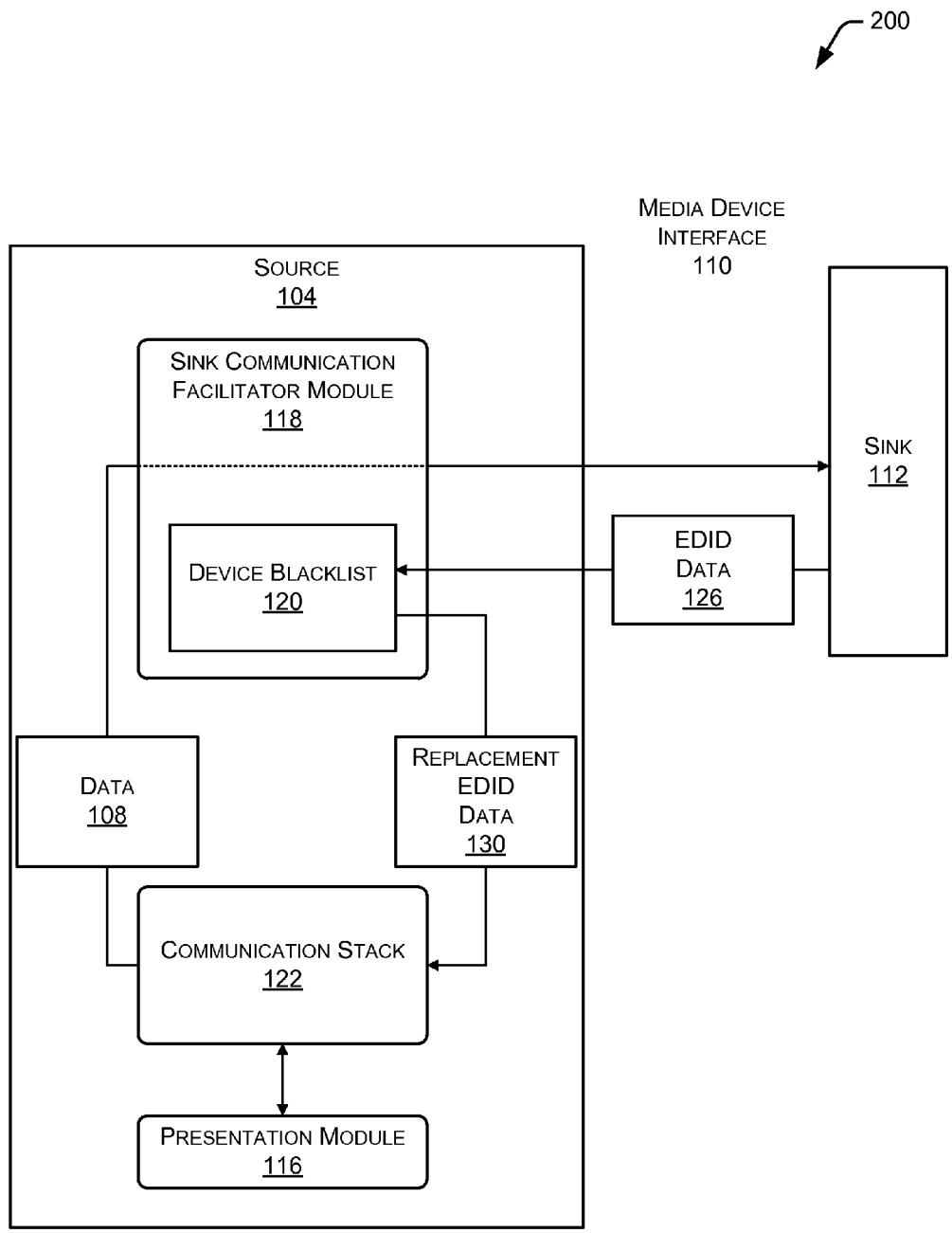
FIG. 2 illustrates a block diagram of communication between the source and the sink, wherein extended display identification ("EDID") received from the sink is superseded by replacement EDID information.

FIG. 2 illustrates a block diagram 200 of communication between the source 104 and the sink 112. In this illustration the EDID data 126 is received by the sink communication facilitator module 118 from the sink 112 or from the sink 112 via an intermediary device coupled to the sink using the media device interface 110.

The sink communication facilitator module 118 processes the EDID data 126 to determine a device identifier which is associated with the sink 112. The device identifier comprises data which is indicative of a particular make, model, or design of the sink 112. The EDID data 126 may encode a manufacturer identifier, model number, product code, and so forth. In one implementation, one or more of the manufacturer identifier, the model number, or the product code may be used to generate the device identifier. In another implementation a serial number unique to the particular sink 112 may be used. In yet another implementation, EDID data may be used to identify a particular sink 112.

The sink communication facilitator module 118 may search the device blacklist 120 based at least in part on the device identifier. The device blacklist 120 may include information such as the replacement EDID data 130 associated with the device identifier. The replacement EDID data 130 associated with the device identifier may be retrieved and provided by the sink communication facilitator module 118 to the communication stack 122.

The communication stack 122 accepts the replacement EDID data 130 and configures a link between the source 104 and the sink 112 accordingly. The presentation module 116 or other modules may now use the correctly configured communication stack 122 to send or receive data 108 to the sink 112. Because the replacement EDID data 130 provides correct and actual operational characteristics of the sink 112, an operational state 128 is provided for presentation.

In some implementations the sink communication facilitator module 118 may perform other functions, such as validating or overriding information indicative of a connection between the source 104 and the sink 112 using the media device interface 110. Some devices implementing HDMI as the media device interface 110 may force state changes in a hot plug detect state regardless of physical connection or disconnection. For example, the sink 112 may indicate that the source 104 has been disconnected when no physical disconnection has taken place. Correct indication of the hot plug detect state is useful in that a high voltage (+5 volts) on the hot plug detect pin is designated in the HDMI specification as indicating that EDID data 126 (or E-EDID data) is available. Incorrect hot plug detect state may result in operational problems, such as the source 104 waiting indefinitely for EDID data, incorrect physical and logical addresses on the media device interface 110, and so forth. The sink communication facilitator module 118 may be configured to change the hot plug detect state, or act to override other modules or devices on the media device interface 110 which attempt to change the hot plug detect state.

Figure 3:
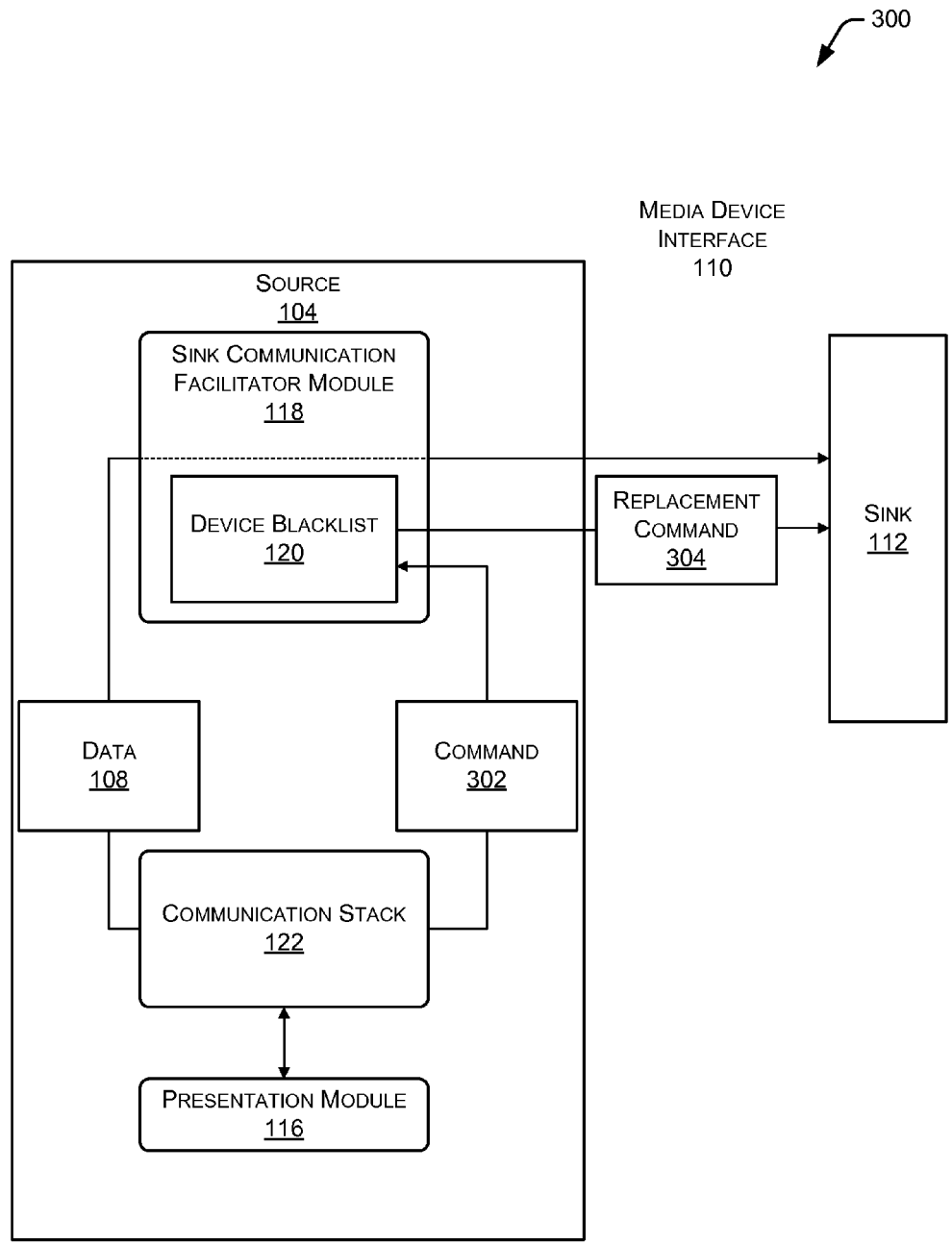
FIG. 3 illustrates a block diagram of communication between the source and the sink, wherein a command from the communication stack is superseded by a replacement command.

FIG. 3 illustrates a block diagram 300 of communication between the source 104 and the sink 112 with modification of commands by the sink communication facilitator module 118. As described above, in some implementations commands generated by the source 104 may result in undesired actions when received by the sink 112. For example, the sink 112 may improperly interpret a command resulting in an error state 124.

In this illustration, the presentation module 116 or another module may have caused the communication stack 112 to send a command 302 to the sink 112. The sink communication facilitator module 118 is configured to receive the command 302. Similar to the process described above, the sink communication facilitator module 118 uses the device identifier associated with the sink 112 to search the device blacklist 120. The device blacklist 120 may include a mapping between the command 302 and a replacement command 304 which is associated with the device identifier. The replacement command 304 is retrieved and provided by the sink communication facilitator module 118 to the sink 112, instead of the command 302. In some instances the replacement command 304 may be a null or empty command, such that no information is sent to the sink 112.

In another implementation the sink communication facilitator module 118 may be configured intercept communications between the modules of the source 104 such as the presentation module 116 and the communication stack 122. The sink communication facilitator 118 may then modify the communication prior to arrival at the communication stack 122. This modification may be as described above, such as by introducing replacement commands 304 or discarding the erroneous command 302.

Figure 4:
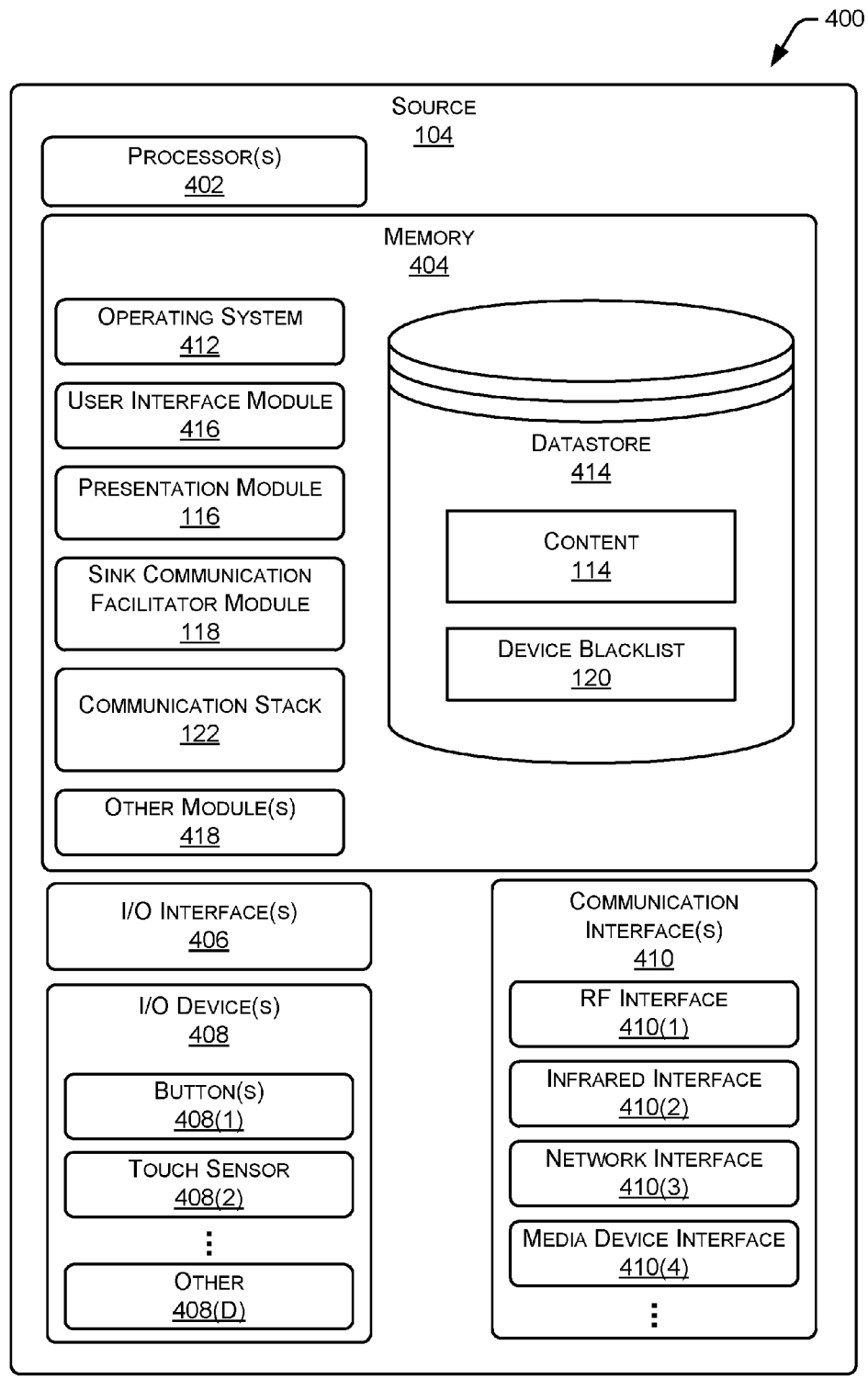
FIG. 4 illustrates a block diagram of the source with a sink communication facilitator module configured to provide replacement EDIDs to the communication stack and replacement commands to the sink.

FIG. 4 illustrates a block diagram 400 of the source 104 device. The source 104 may comprise one or more processors 402, one or more memories 404, one or more input/output ("I/O") interfaces 406, one or more I/O devices 408, and one or more communication interfaces 410.

The processor 402 may comprise one or more cores and is configured to access and execute at least in part instructions stored in the one or more memories 404. The one or more memories 404 comprise one or more computer-readable storage media ("CRSM"). The one or more memories 404 may include, but are not limited to, random access memory ("RAM"), flash RAM, magnetic media, optical media, and so forth. The one or more memories 404 may be volatile in that information is retained while providing power or non-volatile in that information is retained without providing power.

The one or more I/O interfaces 406 allow for coupling I/O devices 408 to the source 104. The I/O interfaces 406 may comprise inter-integrated circuit ("I2C"), serial peripheral interface bus ("SPI"), universal serial bus ("USB"), RS-232, RS-432, and so forth. The I/O devices may include buttons 408(1) such as in keypads or keyboards, or touch sensors 408(2). The buttons 408(1) may include mechanical buttons, softkeys, keys with integrated displays, and so forth. The touch sensors 408(2) may comprise interpolating force sensing resistor ("IFSR") arrays, capacitive sensors, optical touch sensors, and so forth.

One or more other I/O devices 408(D) such as speakers, microphones, displays, external memory devices, global positioning system receivers, and so forth may also be coupled to the source 104 using the I/O interfaces 406. In some implementations, one or more of the I/O devices 408 may be provided by the remote control 106.

The one or more communication interfaces 410 provide for the transfer of data between the source 104 and other devices such as the remote control 106, the servers 120, and so forth. The communication interfaces 410 may include, but are not limited to, PANs, wired local area networks ("LANs"), wireless local area networks ("WLANs"), wireless wide area networks ("WWANs"), and so forth. As shown here, the communication interfaces 410 may comprise one or more RF interfaces 410(1), one or more infrared interfaces 410(2), one or more network interfaces 410(3), one or more media device interfaces 410(4), one or more other interfaces, or a combination thereof.

The RF interface 410(1) may comprise a radio transmitter, radio receiver, or radio transceiver. The RF interface 410(1) may be compliant with one or more standard protocols, such as the Bluetooth™ PAN. The RF interface 410(1) may be used to couple to the remote control 106. The infrared interface 410(2) may comprise an infrared transmitter, infrared receiver, or an infrared transceiver. In some implementations the infrared interface 410(2) of the source 104 may consist of the infrared receiver and omit the infrared transmitter.

The network interface 410(3) may be configured to connect the source 104 wired or wirelessly to one or more networks 132. These networks may include a LAN, WAN, WLAN, WWAN, and so forth. For example, the network interface 410(3) may comprise a transceiver and other devices configured to be compliant with the Institute of Electrical and Electronics Engineers ("IEEE") 802.11 standards. The network interface 410(3) may include a transceiver and other devices configured to be compliant with WWAN networks provided by one or more cellular carriers. For example, the network interface 410(3) may be configured to cellular data networks such as those based on the IEEE 802.16 standards such as WiMax.

The communication interface 410 of the source 104 may also comprise the media device interface 410(4) as described above. For example, several HDMI connections may be supported to allow coupling to one or more sources 104 or sinks 112.

In other implementations other devices or components may be coupled to or incorporated within the source 104. For example, digital rights management ("DRM") devices may be provided to control access to content.

The one or more memories 404 may store code or program instructions for execution by the processor 402 to perform certain actions or functions. In some implementations at least a portion of the instructions may be stored in external memory accessible to the source 104, such as on the server 134.

These instructions in the one or more memories 404 may include an operating system 412. The operating system 412 is configured to manage hardware resources such as the I/O interfaces 406 and provide various services to applications executing on the processor 402.

In some implementations the operating system 412 may be configured to place the source 104 into a diagnostic mode based at least in part on the error state 124. For example, after encountering the error state 124, the user 102 may provide input such as pressing a particular key on the remote control 106 during power on of the source 104 to initiate the diagnostic mode. In another example, the source 104 may enter the diagnostic mode automatically after encountering the error state 124.

In the diagnostic mode, various functions may be provided which facilitate resolution of the error state 124. In one implementation, the communication stack 122 may be placed into a minimal presentation mode to allow some meaningful presentation by the sink 112. For example, the minimal presentation mode for the display sink 112(1) may be 480p video at 30 fps. In another implementation, additional telemetry associated with data received from the media device interface 410(4) may be acquired and stored.

The one or more memories 404 may also store a datastore 414 containing information about the operating system 412, configuration files, the content 114 or a portion thereof, the device blacklist 120 or a portion thereof, and other data. The datastore 414 may comprise a database, flat file, linked list, or other data structure.

In some implementations the device blacklist 120 may be stored on the source 104 as a device optimized binary image. This device optimized binary image may be configured specifically for a particular processor 402 or architecture of the source.

A user interface module 416 is configured to provide a user interface for presentation to the user 102. For example, the user interface module 416 may generate images of a graphical user interface comprising elements such as menus and prompts for presentation on a display such as the sink 112(1). In another example, the user interface module 416 may generate audible prompts for presentation using the audio system sink 112(2). The user interface module 416 may also be configured to accept input from the user 102. For example, the user interface module 416 may be configured to interpret input from the remote control 106 as selecting a particular element of the graphical user interface.

The memory 404 may also include the presentation module 116, the sink communication facilitator module 118, and the communication stack 122. As described above, the presentation module 116 is configured to access the content 114 and present the content 114 using one or more sinks 112. For example, the presentation module 116 may be configured to receive content 114 streamed from a content provider server and send data 108 based on the streamed content to the sink 112 for presentation.

The sink communication facilitator module 118 is configured to modify communications between the communication stack 122 and other modules in the source 104, the sink 112, or both. As described above, the sink communication facilitator module 118 may determine the device identifier for the sink 112 and, when available, retrieve information from the device blacklist 120. The retrieved information may then be used to modify the communications.

The communication stack 122 implements one or more data transfer protocols to provide data connectivity between the source 104 and the sink 112 using the media device interface 410(4). For example, the communication stack 122 may implement the protocols set forth in the HDMI specification release 1.4 published by HDMI Licensing, LLC.

Other modules 418 may also be stored in the memory 404. For example, a sink testing module may be configured to initiate a series or set of outputs to send to the sink 112 and receive input to generate test data. In one implementation, the replacement EDID data 130 which correctly characterizes the operational characteristics of the sink 112 may be based at least in part on the test data associated with the sink 112.

Figure 5:
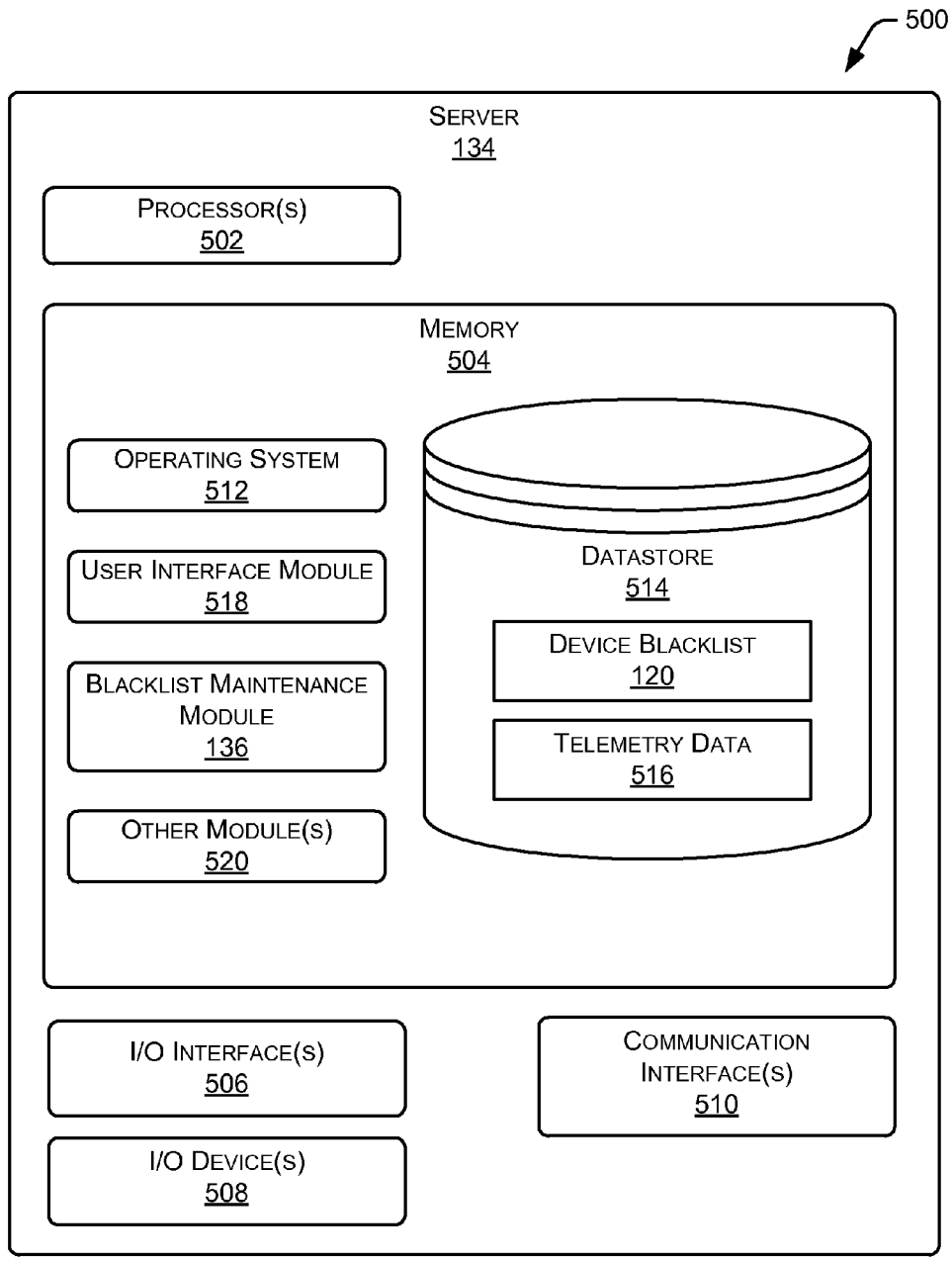
FIG. 5 illustrates a block diagram of a server configured to provide device blacklist data about a plurality of sink devices, wherein the blacklist data may provide replacement EDIDs, replacement commands, or both.

FIG. 5 illustrates a block diagram 500 of the server 134. The server 134 may comprise one or more processors 502, one or more memories 504, one or more input/output ("I/O") interfaces 506, one or more I/O devices 508, and one or more communication interfaces 510.

The processor 502 may comprise one or more cores and is configured to access and execute at least in part instructions stored in the one or more memories 504. The one or more memories 504 comprise one or more CRSM. The one or more memories 504 may include, but are not limited to, RAM, flash RAM, magnetic media, optical media, and so forth. The one or more memories 504 may be volatile in that information is retained while providing power or non-volatile in that information is retained without providing power.

The one or more I/O interfaces 506 allow for coupling I/O devices 508 to the server 134. The I/O interfaces 506 may comprise I2C, SPI, USB, RS-232, RS-432, and so forth. The I/O devices 508 may include keyboards, external memory, and so forth.

The one or more communication interfaces 510 provide for the transfer of data between the server 134 and other devices such as the source 104 devices. The communication interfaces 510 may include, but are not limited to, PANs, LANs, wireless WLANs, WWANs, and so forth.

In other implementations other devices or components may be coupled to or incorporated within the server 134. For example, digital rights management ("DRM") devices may be provided to control access to content.

The one or more memories 504 may store code or program instructions for execution by the processor 502 to perform certain actions or functions. In some implementations at least a portion of the instructions may be stored in external memory accessible to the server 134.

These instructions in the one or more memories 504 may include an operating system 512. The operating system 512 is configured to manage hardware resources such as the I/O interfaces 506 and provide various services to applications executing on the processor 502.

The one or more memories 504 may also store a datastore 514 containing information about the operating system 512, configuration files, the device blacklist 120 or a portion thereof, telemetry data 516, and other data.

The device blacklist 120 data may be stored on the server 134 in an intermediate file format. For example, the device blacklist 120 may be expressed as one or more extensible markup language ("XML") files. Changes to the device blacklist 120 may result in adds, deletions, or updates to the device blacklist 120.

The telemetry data 516 comprises information received from the source 104. The telemetry data 516 may include information associated with or indicative of the error state 124. For example, the telemetry 516 may include the data sent to the sink 112 along the media device interface 110 prior to entry into the error state 124. The datastore 514 may comprise a database, flat file, linked list, or other data structure.

A user interface module 518 is configured to provide a user interface for presentation to the user 102. For example, the user interface module 518 may generate images of a graphical user interface comprising elements such as menus and prompts for presentation. The user interface module 518 may provide user interfaces configured to allow for the maintenance and distribution of the device blacklist 120. For example, a web based user interface may be provided allowing engineers to review the telemetry 518 to determine how to generate replacement EDID data 130.

The memory 504 may also store the blacklist maintenance module 136. The blacklist maintenance module 136 is configured to maintain the device blacklist 120. This may include receiving data indicative of error states 124 on one or more sources 104. For example, the source 104 may be configured to contact the server 134 and provide telemetry after indication of the error state 124.

The blacklist maintenance module 136 may also be configured to generate, or facilitate generation of, entries in the device blacklist 120. For example, a device identifier and replacement EDID data 130 for the identified device may be generated by automated analysis of the telemetry data 516. In another implementation entries or edits to the device blacklist 120 may be provided based at least in part on user input, as described above.

In some implementations, the blacklist maintenance module 136 may distribute the device blacklist 120 or a portion thereof as a device optimized binary image to the source 104. For example, the blacklist maintenance module 136 may generate a device optimized binary image of a version of the device blacklist 120 associated with a particular processor 402. The binary image may then be delivered to the source 104 using the communication interface 510.

Other modules 520 may also be stored in the memory 504. For example, an error state analysis module may be configured to provide reports indicating device identifiers for which compatibility could be improved.

FIG. 6 illustrates a block diagram 600 of one implementation of the device blacklist 120. While the device blacklist 120 is illustrated as a table, the information may be stored in one or more other data structures. Different versions of the device blacklist 120 may be provided. Version control may be used to manage the different versions of the device blacklist 120.

The device blacklist 120 comprises a device identifier 602. The device identifier 602 comprises information indicative of a particular sink 112. For example, the device identifier 602 may designate a particular make, model, type, and so forth of the sink 112. In some implementations the device identifier 602 may be based at least in part on data received from or derived from EDID data 126 or the replacement EDID data 130. In some implementations a particular unique device may be specified, such as when the device identifier 602 comprises a device serial number.

Each device identifier 602 item in device blacklist 120 may have one or more actual operational characteristics 604. These actual operational characteristics 604 are descriptive the operational characteristics such as modes, formats, resolutions, color gamut, frame rate, digital or analog data, sync support, image size(s), chromaticity coordinates, timing bitmap, timing information, descriptor blocks, and so forth which the sink 112 has been determined to actually support. These actual operational characteristics 604 may be determined based at least in part on testing of the sink 112. In this illustration the actual operational characteristics 604 are expressed as single bit flags as to whether the particular sink 112 associated with the device identifier 602 supports various modes such as 480p formatted images 604(1), 1080p formatted images 604(2), 720p formatted images 604(3), 5.1 audio 604(4). Other operational characteristics 604(A) may be specified, such as maximum data rate, hot plug parameters, and so forth.

The replacement EDID 130 may be based on the actual operational characteristics 604. As a result, the actual operational characteristics 604 expressed in the replacement EDID 130 supersede the information in the EDID data 126 provided by the sink 112. For example, the EDID data 126 stored in the sink 112 and provided to the source 104 using the media device interface 110 may incorrectly indicate that 1080p formatted images are supported. The actual operational characteristics 604 associated with this sink 112 may thus indicate that 1080p formatted images are unsupported, for example setting the attribute 1080p to "0".

In some implementations the device blacklist 120 may omit storing the discrete actual operational characteristics 604, and instead store the replacement EDID 130 which incorporates this information.

The device blacklist 120 may also store the commands 302 which have been previously determined to be problematic when used with the sink 112, and a corresponding replacement command 304 where appropriate. For example, the sink 112 with the device identifier 602 of GR93 may incorrectly respond to the command "Set_AVMUTE", and thus the associated replacement command 304 may be a <null> command which is not send to the sink 112.

In another implementation, the EDID data 126 itself may be used index information from the device blacklist 120. For example, rather than identifying the sink 112 using make and model, the received EDID data 126 may be used to reference a particular replacement EDID data 130. In this implementation, the received EDID data 126 may be read to determine a string, but may not be processed to interpret data within that string, such as the manufacturer identification, model number, and so forth. The implementations and examples in this disclosure which refer to using the device identifier 602 thus also apply to implementations where the EDID data 126 or other information is used to index particular data within the device blacklist 120.

Portions of the data within the device blacklist 120 may be hashed. In one implementation one or more of the device identifier 602, the actual operational characteristics 604, the commands 302, and so forth may be hashed. This hashing may facilitate retrieval of data from the device blacklist 120 in a constant or pre-determined amount of time or processor resources. Stated another way, the device blacklist 120 may be configured to provide an O(1) retrieval outcome, executing with the about the same time regardless of the size of the device blacklist 120 provided to the source 104.

Illustrative Processes

Figure 7:
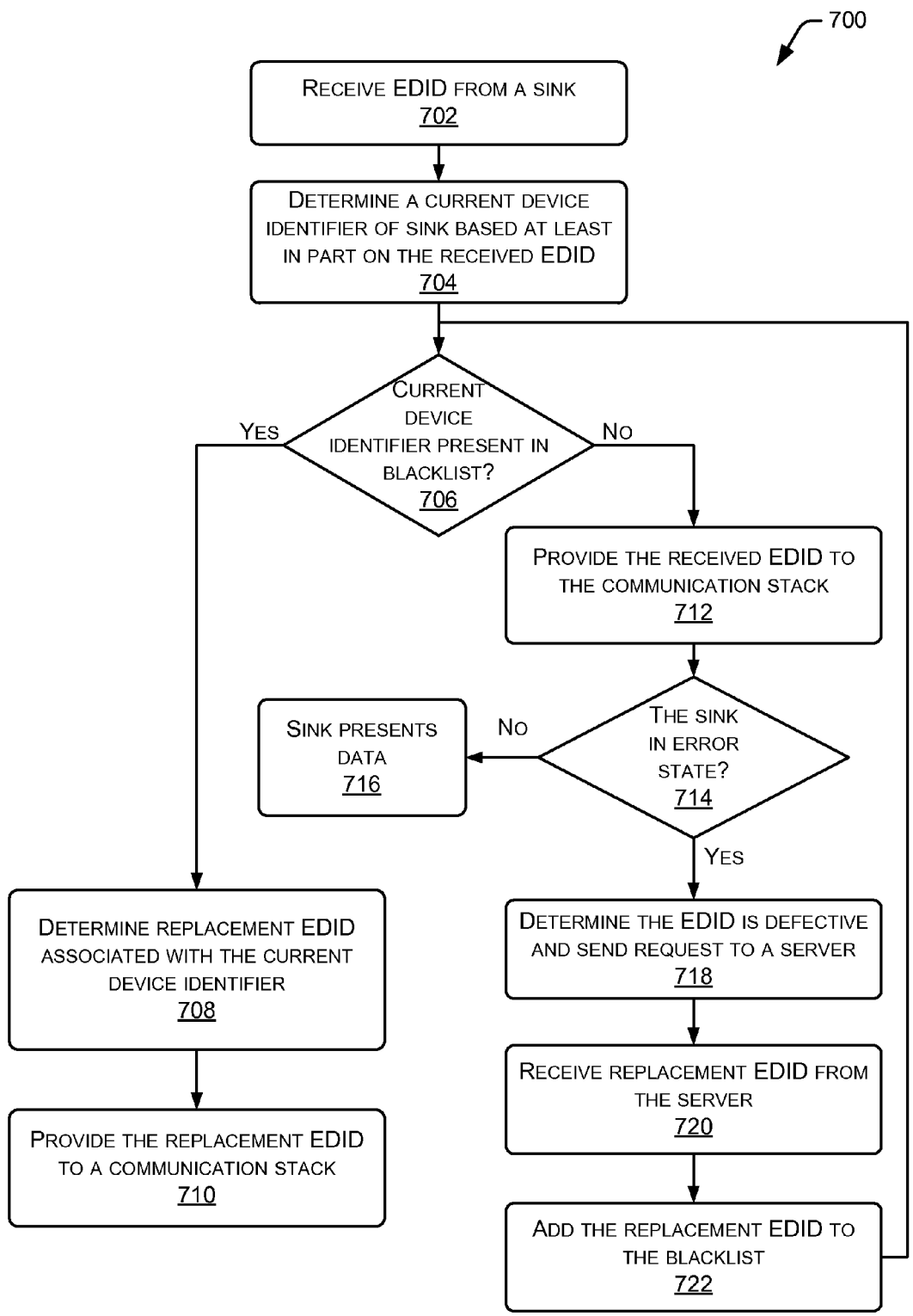
FIG. 7 is a flow diagram of a process for providing replacement EDID information to the communication stack.

FIG. 7 is a flow diagram 700 of a process for providing the replacement EDID data 130 to the communication stack 122. This process may be implemented by the source 104 using the sink communication facilitator module 118.

Block 702 receives data from the sink 112. As described above, the sink 112 may comprise a media presentation device such as a display, an audio system, haptic output device, and so forth. The data may be indicative of a particular make, model, or serial number of the sink 112, operational characteristics of the sink 112, and so forth. For example, the received data may indicate image or audio formats supported by the sink 112 for presentation. In one implementation, the received data may comprise the EDID data 126. As described above, the operational characteristics may comprise one or more of mode, format, resolution, color gamut, timing information, frame rate, audio encoding, and so forth which are supported by the sink 112.

Based at least in part on the received data, block 704 determines the device identifier 602 of the sink 112. In some implementations, this determination may comprise processing the received data to determine one or more of a manufacturer, model number, or product code. For example, the EDID data 126 may be parsed to retrieve this information. The device identifier is indicative of a particular design of the sink 112, such as a product model of the sink 112.

Block 706 accesses a list which comprises one or more previously stored device identifiers and replacement data associated with the one or more device identifiers. Block 706 further determines when the device identifier determined from the received data is present in the list. The list may be received from an external device, such as the server 134. The list may comprise the device blacklist 120. The determination of block 706 may include comparing at least a portion of the current device identifier of the sink 112 with the one or more previously stored device identifiers in the list. For example, where the list comprises the device blacklist 120, the comparison may be with the previously stored device identifiers 602.

When block 706 determines that the device identifier matches an entry within the device blacklist 120, the process proceeds to block 708. Based at least in part on the determination, block 708 determines replacement data associated with the device identifier of the sink 112. For example, the replacement EDID data 130 may be determined which is associated with the sink device 112(1).

Block 710 provides the replacement data associated with the device identifier of the sink 112 to the communication stack 122. The communication stack 122 may then be configured based at least in part on the replacement data. For example, the communication stack 122 may be configured based on the information provided in the replacement EDID data 130, rather than the originally received EDID data 126. This configures the source 104 to communicate with the sink 112 via the media interface device interface 110 using the replacement EDID data 130 corresponding to the actual operational characteristics 604 of the sink 112, resulting in an operational state 128.

As described above, the communication stack 122 is configured to provide data exchange between the source 104 and the sink 112. In one implementation, with successful communication now available, the source 104 may access a file comprising content 114 and send at least a portion of the file to the sink 112 using the communication stack 122 as configured with the replacement data.

Returning to block 706, when the device identifier received from the sink 112 is not determined to be present in the list the process may proceed to block 712. For example, the device identifier may not be present in the device blacklist 120.

Block 712 provides the received data to the communication stack 122. For example, the received EDID data 126 may be sent and used to configure the communication stack 122 to establish communication with the sink 112.

Block 714 determines whether the received data produces an error state at the sink 112. As described above, when the sink 112 comprises a display, the error state 124 at the sink 112 may manifest as a black screen presented on the display. In comparison, when the sink 112 comprises an audio system configured to receive data provided by the communication stack 122 and present audio output, the error state 124 may include the presentation of audio noise, pops, hisses, and so forth.

Several implementations are available to determine that the sink 112 is in the error state 124. In one implementation the determining the received data produces the error state 124 at the sink 112 comprises receiving user input indicative of the error state 124. For example, the user 102 may press one or more buttons on the remote control 106 indicating that there is a problem with presentation on the sink 112.

In another implementation, mode data may be received indicating the sink 112 is a particular mode such as a diagnostic mode, safe mode, and so forth. The determination that the received data produces the error state 124 at the sink 112 may be based at least in part on the received mode data. For example, received mode data indicating that the device is in a "safe mode" may be indicative that the previously used received data was in error. As described above, the sink 112 may support a diagnostic mode for troubleshooting. This diagnostic mode may be initiated automatically by the source 104, or may be manually initiated by the user 102. For example, manual initiation may involve the user 102 pressing and holding a power button on the source 104. In this implementation, an assumption may be made that entry of the sink 112 into the diagnostic mode is indicative of a problem with communication between the source 104 and the sink 112.

In yet another implementation, the determining the received data produces the error state 124 at the sink 112 comprises receiving from the sink 112 data indicative of the error state 124. For example, the sink 112 may detect the attempt to communicate, and may send a pre-determined signal to the source 104 using the media device interface 110 to indicate that a fault exists.

When block 714 determines that no error state exists, the process proceeds to block 716 which presents the data 108 using the sink 112. When block 714 determines that an error state 124 does exist on the sink 112, the process proceeds to block 718.

Block 718 determines that the received data is faulty and requests replacement data associated with the identified device. In some implementations, the received data from the sink 112 may be sent to the server 134 for further processing, analysis, diagnostics, and so forth. The determination that the received data is faulty may be based at least in part on the determination of the sink 112 being in the error state 124.

Block 720 receives the replacement data from the server 134. For example, the replacement EDID data 130, the replacement command 304, or both may be received by the source 104 from the server 134 using the network 132.

Block 722 adds the received replacement data to the list. For example, the replacement EDID data 130 and the associated device identifier may be added to the device blacklist 120 stored in the datastore 414 of the source 104. In another implementation, the block 722 may replace the list with the received replacement data. For example, the source 104 may receive an updated version of the device blacklist 120 in a device optimized binary image from the server 134 which supersedes a previous version of the device blacklist 120. The process may then continue to block 706. With the additional data in the list, the sink 112 now operates properly.

Figure 8:
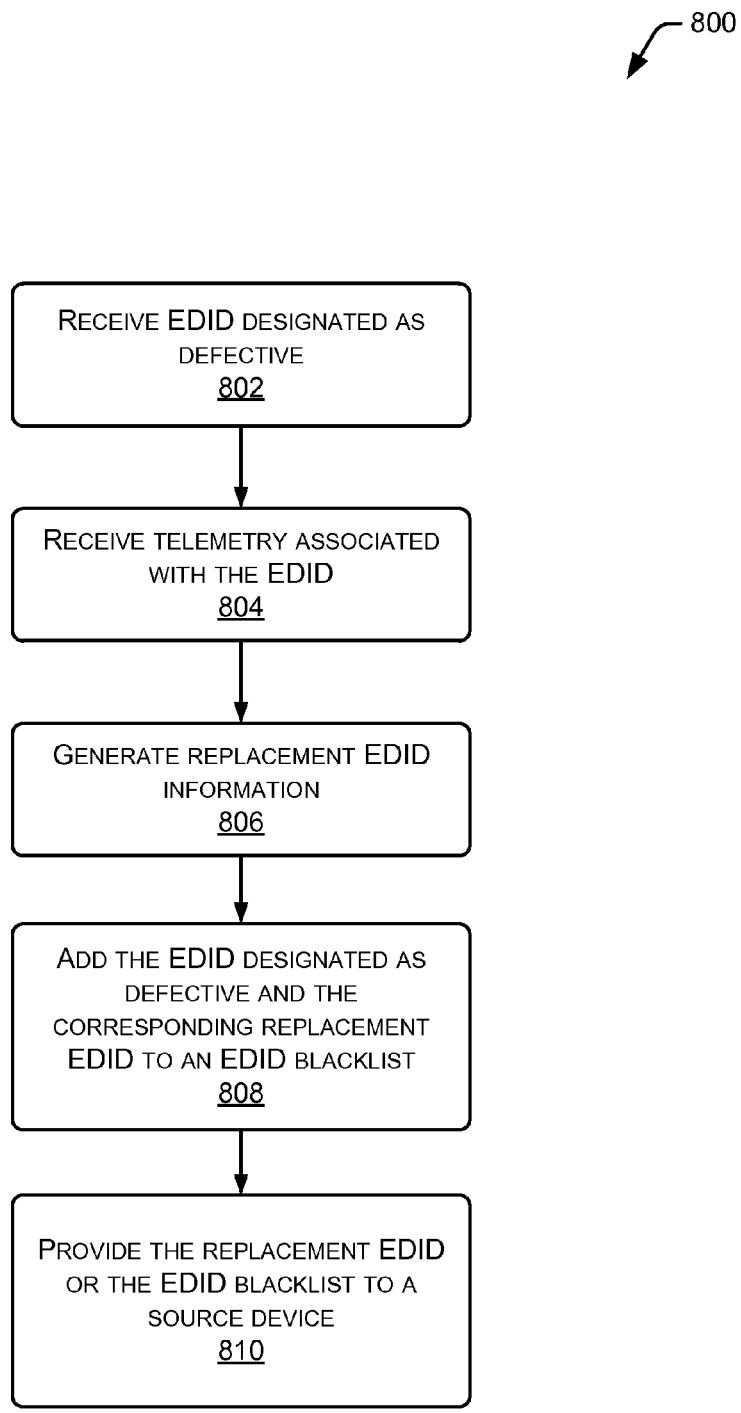
FIG. 8 is a flow diagram of a process for generating replacement EDID data.

FIG. 8 is a flow diagram 800 of a process for generating the replacement EDID data 130. A variation of this process may also be applied to generating replacement commands 304 as well. This process may be implemented by the server 134 using the blacklist maintenance module 136.

Block 802 receives data from the source 104. The received data may be designated as defective due to generation of at least one error state 124 in the sink 112 when coupled to the source 104 device using the communication stack 122.

In some implementations the received data may comprise the EDID data 126 received from the sink 112. This EDID data 126 may be expressed in an extended display identification ("EDID") data structure as promulgated by the Video Electronics Standards Association ("VESA").

As described above, the EDID data 126 may be used to configure the communication stack 122 of the source 104. The communication stack 122 may be configured to send data using a high definition multimedia interface ("HDMI").

In some implementations, block 804 receives telemetry data 516 from the source 104. The telemetry data 516 may be indicative of the at least one error state 124 in the sink 112. For example, the telemetry data 516 may include data exchanged on the media device interface 110 prior to occurrence of the error state 124 on the sink 112.

Block 806 generates replacement data. The replacement data may be based at least in part on one or more of user input, the received data, or received telemetry. The replacement data is configured to correct the at least one error state in the sink 112 which results from the incorrect received data. For example, the user 102 may generate the replacement EDID data 130 by correcting errors in the EDID data 122, such that when the replacement EDID data 130 is used by the source 104, few or no error states 124 are produced in the sink 112.

In one implementation, a test comprising a series of outputs may be generated and sent to the sink 112. The series of outputs may correspond to one or more different operational characteristics of the sink 112. For example, a first output may configure the communication stack to send images at 1080p, a second output may configure the communication stack to send images at 720p, and so forth. As described above, the operational characteristics may include one or more of mode, format, resolution, color gamut, timing, frame rate, and so forth as supported by the sink 112.

In one implementation, the telemetry received from the sink 112 may be processed to determine which of the series of outputs generate an error state 124 or a operational state. The replacement EDID data 130 may be generated based at least in part on a correspondence between the series of outputs and the error state 124 or operational state 128. Continuing the example, outputs which result in an error state 124 may be encoded such that they are disallowed in the replacement EDID data 130 while outputs which result in an operational state 128 are encoded such that they are permitted.

In another implementation, the generating the replacement EDID data 130 may be based at least in part on receiving user input indicative of one or more operational characteristics of the sink 112. The user 102 may manually enter the supported operational characteristics of the sink 112, respond to the testing described above, or a combination thereof. For example, the user 102 may press a particular button on the remote control 106 indicating that a particular output is properly displayed on the sink 112(1) during testing. The generation of the replacement EDID data 130 may thus be based at least in part on the received user input. For example, the replacement EDID data 130 may include that the sink 112(1) supports 1080p video at 60 frames per second which the user 102 has indicated is displayed properly, that is, which results in an operational state 128. Likewise, user input indicative of an error state 124 may be used to designate in the replacement EDID data 130 that a corresponding set of operational characteristics is unsupported by the sink 112.

Block 808 adds at least a portion of the received data to a list and associates the replacement data with the received data. For example, the device identifier which is associated with the received EDID data 126 may be added along with the corresponding replacement EDID data 130 to the device blacklist 120.

Block 810 provides the list or a portion thereof to the source 104. For example, the updated device blacklist 120 may be transmitted to the source 104 for use by the sink communication facilitator module 118.

Figure 9:
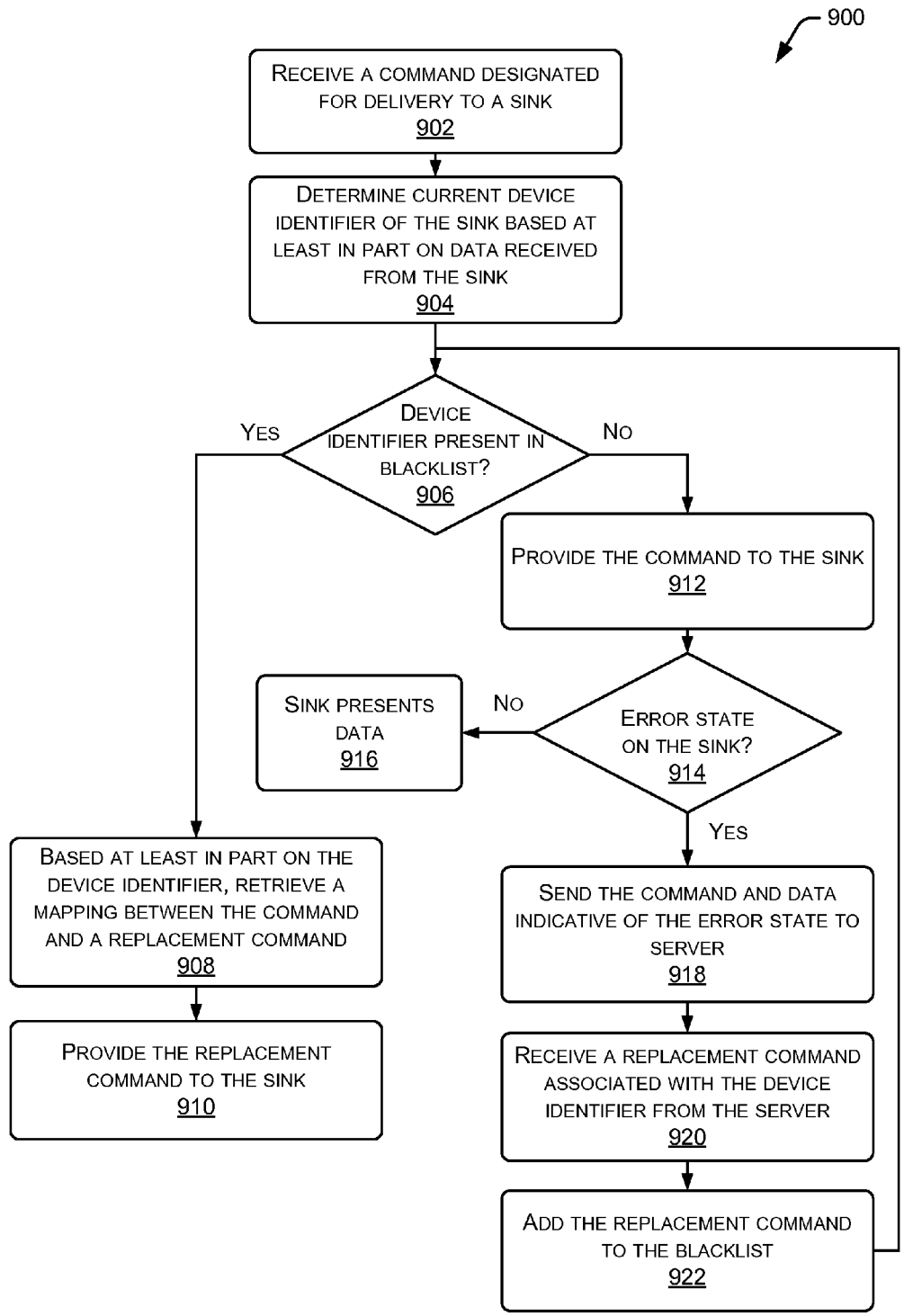
FIG. 9 is a flow diagram of a process for providing replacement commands to the sink.

FIG. 9 is a flow diagram 900 of a process for providing replacement commands 304 to the sink 112. As described above, in some situations the commands 302 sent by the communication stack 122 to the sink 112 may result in undesirable behavior. For example, the sink 112 may be improperly programmed such that receipt and processing of the command 302 would result in an error state 124.

Block 902 receives a command 302 designated for delivery to the sink 112 using the communication stack 122 as configured to communicate with the sink 112. For example, the command 302 may comprise an instruction configured to mute audio presentation by the sink 112, such as the "Set_AVMUTE" command.

Block 904 determines a device identifier of the sink 112. As described above, this may be based at least in part on data received by the source 104 from the sink 112, such as the EDID data 126. The EDID data 126 may include information indicative one or more of a manufacturer, model number, or product code. The device identifier may be generated based at least in part on the EDID data 126.

Block 906 determines when the device identifier is present in a list. This determination may include accessing the list and comparing the determined device identifier of the sink 112 with the one or more device identifiers of the list. In some implementations the list may comprise the device blacklist 120 as described above. The device blacklist 120 may include one or more device identifiers and a mapping between the command 302 and a replacement command 304.

When block 906 determines the device identifier is indicated in the list, the process proceeds to block 908. Based at least in part on the device identifier, block 908 retrieves the associated mapping between the command 302 and the replacement command 304.

Block 910 provides the replacement command 304 to the sink 112. Continuing the example above, the replacement command 304 may comprise a null or empty command.

In one implementation, the sink communication facilitator module 118 may send the replacement command 304 to the sink 112, rather than the originally sent command 302. In another implementation, the sink communication facilitator module 118 may provide the replacement command 304 to the communication stack 122 which in turn provides the replacement command 304 to the sink 112.

Returning to block 906, when the device identifier is not present in the list, the process proceeds to block 912. Block 912 provides the command 304 to the sink 112. Continuing the example, the "Set_AVMUTE" may be send using the media device interface 110 to the sink 112.

Block 914 determines when an error state 124 exists on the sink 112. As described above with regard to block 714, several implementations are possible to determine presence of the error state 124 at the sink 112.

When no error state 124 is determined on the sink 112, the process proceeds to 916. Block 916 may continue to provide data 108 to the sink 112, send other commands, and so forth. When an error state 124 is determined on the sink 112, the process proceeds to block 918.

Block 918 sends the command 302 to the server 134. In some implementations data indicative of the error state 124 may be sent as well, such as the telemetry data 516.

Block 920 receives the replacement command 304 associated with the device identifier from the server 134. For example, the replacement command 304 corresponding to a <null> action may be received.

Block 922 adds the replacement command 304 to the list. For example, the replacement command 304 and the corresponding device identifier may be added to the device blacklist 120. In another implementation, the block 922 may replace the list with the received replacement command 304. For example, the source 104 may receive an updated version of the device blacklist 120 in a device optimized binary image from the server 134 which supersedes a previous version of the device blacklist 120. The process may then return to block 906. With the additional data in the list, the replacement command 304 which may subsequently be sent to the sink 112 results in the operational state 128.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
   an interface configured to communicatively couple to a media presentation device;
   at least one memory storing computer-executable instructions; and
   at least one processor coupled to the interface, and configured to access the at least one memory and execute the computer-executable instructions to:
   receive extended display identification (EDID) data from the media presentation device using the interface, wherein the EDID comprises data indicative of one or more operational characteristics of the media presentation device;
   based at least in part on the received EDID data, determine a current device identifier of the media presentation device, wherein the current device identifier is indicative of a make, model, or serial number of the media presentation device;
   access a blacklist, the blacklist comprising a previously stored device identifier and a corresponding replacement EDID;
   based at least in part on the determined current device identifier, retrieve, from the blacklist, a replacement EDID corresponding to the determined current device identifier, wherein the replacement EDID comprises data indicative of a set of actual operational characteristics of the media presentation device, wherein the operational characteristics comprise one or more of: mode, format, resolution, color gamut, timing information, or frame rate as supported by the media presentation device; and
   configure communication with the media presentation device via the interface using the replacement EDID such that the communication corresponds to the actual operational characteristics of the media presentation device.

2. The device of claim 1, wherein the interface comprises a high-definition multimedia interface ("HDMI").

3. The device of claim 1, wherein the replacement EDID is based at least in part on test data associated with the media presentation device or a similar media presentation device.

4. A computer-implemented method for utilizing processing resources of a computerized system, the computer-implemented method comprising:
   receiving data from a sink device;
   based at least in part on the received data, determining a current device identifier of the sink device;
   accessing a list, the list comprising a previously stored device identifier and corresponding replacement data, wherein the received data and the replacement data comprise information expressed in an extended display identification (EDID) data structure as promulgated by the Video Electronics Standards Association;
   determining the current device identifier of the sink device corresponds to the previously stored device identifier;
   providing, based on the determination, the replacement data associated with the current device identifier of the sink device to a communication stack, wherein the communication stack is configured to exchange data with the sink device; and
   configuring the communication stack for the exchange of data with the sink device based at least in part on the replacement data.

5. The method of claim 4, wherein the configuring the communication stack comprises setting one or more of: mode, format, resolution, color gamut, timing information, frame rate, or audio encoding.

6. The method of claim 4, wherein determining the current device identifier of the sink device comprises inspecting the received data to determine one or more of a manufacturer, model number, or product code.

7. The method of claim 4, further comprising:
providing the received data to the communication stack;
determining that the received data produces an error state at the sink device;
requesting, from a server, replacement data associated with the current device identifier;
receiving the replacement data from the server; and
adding the received replacement data to the list or replacing the list with the received replacement data.

8. The method of claim 7, further comprising receiving user input indicative of the error state; and wherein the determining that the received data produces the error state at the sink device is based at least in part on the user input.

9. The method of claim 7, further comprising receiving mode data indicating the sink device is in a predetermined mode, and wherein determining that the received data produces the error state at the sink device is based at least in part on the received mode data.

10. The method of claim 7, further comprising:
receiving from the sink device data indicative of the error state; and
wherein determining that the received data produces the error state at the sink device is based at least in part on the received data indicative of the error state.

11. The method of claim 7, wherein the error state comprises one or more of:
a black screen on a display,
incorrect image presentation on the display, or
incorrect audio presentation by a speaker.

12. The method of claim 4, further comprising:
accessing a content file; and
sending at least a portion of the content file to the sink device using the communication stack as configured with the replacement data.

13. The method of claim 4, further comprising receiving the list from an external device.

14. The method of claim 4, wherein the sink device is configured to receive data provided by the communication stack and comprises one or more of:
a display configured to present an image,
an audio system configured to present audio output, or
a haptic output device configured to present haptic output.

15. A computer-implemented method for generating replacement commands for a sink device and stored as instructions on a non-transitory computer-readable medium, the computer-implemented method comprising:
receiving a command designated for delivery to a sink device;
determining a current device identifier of the sink device:
accessing a list, the list comprising a previously stored device identifier and a mapping between the command and a replacement command;
determining the current device identifier of the sink device corresponds to the previously stored device identifier of the list;
retrieving, based on the determination, the associated mapping between the command and the replacement command; and
providing the replacement command to the sink device;
wherein the command comprises an instruction configured to mute audio presentation on the sink device when processed by the sink device and the replacement command comprises a null or empty command.

16. The method of claim 15, the determining the device identifier of the sink device comprising:
receiving extended display identification ("EDID") data from the sink device, wherein the EDID comprises data indicative one or more of a manufacturer, model number, or product code; and
generating the device identifier from the EDID data.

* * * * *